(12) United States Patent
Pollard et al.

(10) Patent No.: US 12,164,025 B2
(45) Date of Patent: Dec. 10, 2024

(54) SCANNING SYNTHETIC APERTURE SONAR SYSTEM

(71) Applicant: The Tomorrow Companies Inc., Boston, MA (US)

(72) Inventors: Brian Pollard, Ventura, CA (US); James R. Carswell, Yarmouthport, MA (US)

(73) Assignee: The Tomorrow Companies Inc., Boston, MA (US)

( * ) Notice: Subject to any disclaimer, the term of this patent is extended or adjusted under 35 U.S.C. 154(b) by 0 days.

(21) Appl. No.: 18/237,313

(22) Filed: Aug. 23, 2023

(65) Prior Publication Data

US 2024/0061106 A1 Feb. 22, 2024

Related U.S. Application Data

(63) Continuation of application No. 16/885,193, filed on May 27, 2020, now Pat. No. 11,774,588.

(60) Provisional application No. 62/853,282, filed on May 28, 2019.

(51) Int. Cl.
*G01S 15/89* (2006.01)

(52) U.S. Cl.
CPC ...... *G01S 15/8904* (2013.01); *G01S 15/8915* (2013.01)

(58) Field of Classification Search
CPC .............. G01S 15/8904; G01S 15/8915
See application file for complete search history.

(56) References Cited

U.S. PATENT DOCUMENTS

| 5,410,621 | A  | 4/1995  | Hyatt    |
| 5,675,550 | A  | 10/1997 | Ekhaus   |
| 5,973,634 | A  | 10/1999 | Kare     |
| 7,038,615 | B2 | 5/2006  | Brookner |
| 2008/0194952 | A1 | 8/2008 | Luo     |
| 2011/0242939 | A1 | 10/2011 | Pederson |
| 2021/0041556 | A1 | 2/2021 | Fox     |

FOREIGN PATENT DOCUMENTS

| FR | 2848675 A1 | 6/2004 |
| FR | 3030721 A1 | 6/2016 |

OTHER PUBLICATIONS

Gebert, N., Krieger, G., and Moreira, A., "Digital Beamforming on Receive: Techniques and Optimization Strategies for High-Resolution Wide-Swath SAR Imaging," IEEE Transactions on Aerospace and Electronic Systems, vol. 45, No. 2, Apr. 2009.

Gebert, N., Krieger, G., and Moreira, A., "Multichannel azimuth processing in ScanSAR and TOPS mode operation," IEEE Transactions on Geoscience and Remote Sensing, vol. 48, No. 7, Jul. 2010.

Kraken, Aqua Pix Minsas, "Seeing with Sound,", Copyright 2012-2017 Kraken Robotics Inc., Nov. 27, 2017 www.Krakenrobotics.com.

*Primary Examiner* — Isam A Alsomiri
*Assistant Examiner* — Abdallah Abulaban
(74) *Attorney, Agent, or Firm* — Nixon & Vanderhye P.C.

(57) ABSTRACT

A synthetic aperture sonar (SAS) system utilizes a novel timing and pointing method to illuminate and process data from multiple receive channels over one or more elevation swaths. The system further utilizes cross-track interferometry to improve accuracy of three-dimensional mapping.

9 Claims, 4 Drawing Sheets

(increasing ACR through the use of 2 PRI's)

(across track interferometry with vertically separated transducer arrays)

(Simulated forward-looking interferometer power (left) and height (right) data, including a long flat surface (i.e. a road) in front of the vehicle, and a 50cm obstacle at 25m distance. The obstacle here has lower contrast than the background, but will still be visible in the height image.)

SCANNING SYNTHETIC APERTURE SONAR SYSTEM

CROSS-REFERENCE TO RELATED APPLICATIONS

This application is a continuation of U.S. patent application Ser. No. 16/885,193 filed May 27, 2020, now U.S. Pat. No. 11,774,588, which claims the benefit of U.S. Provisional Application No. 62/853,282 filed May 28, 2019, all of which are incorporated herein by reference in their entirety and for all purposes.

BACKGROUND OF THE DISCLOSURE

Embodiments of the present disclosure generally relate to synthetic aperture sonar (SAS) systems, and novel methods for operating the same.

The growing unmanned underwater vehicle (UUV) market has typically been dominated by larger, costly vehicles which allow long endurance and complex payloads. The significant cost and deployment/recovery logistics of such vehicles, however, have limited their use, and correspondingly limited the growth of the vehicle market. Recently, smaller mini- and micro-UUVs are coming to market, with price points one or even two orders of magnitude lower than larger, traditional vehicles while also overcoming the logistical challenges of deployment and recovery. However, available payloads that fit within these smaller vehicles are still quite limited.

Underwater mapping remains a key function of UUVs, and side scan or synthetic aperture sonar (SAS) systems are the primary means of providing underwater maps and images. Notably, each system has performance dependencies requiring long transducers that prohibit accommodation on small vehicles. Side scan sonar requires a long transducer for both coverage rate and horizontal resolution; SAS overcomes the resolution dependency, allowing higher resolution by synthesizing a longer aperture using vehicle motion, but still has coverage rate limitations governed by the need to sample fully the range and azimuth spectrums. These limitations, which push transducer lengths to 0.5-1.0 m or longer for practical area coverage rates, make accommodation on a mini- or micro-unmanned underwater vehicle (μUUV) impractical if not impossible.

Synthetic Aperture Sonar (SAS) utilizes the motion of the host vehicle in order to create an aperture larger than the physical antenna size, providing finer along track resolution than is available from side-scan sonar. SAS can provide a theoretical resolution as fine as the half the antenna length. In order to sample fully the Doppler spectrum of the received signal, the system must send a pulse at a rate ($t_{PRI}$) such that the vehicle has moved less than half an antenna length, i.e.

$$t_{PRI} = \frac{l}{2v_p}$$

where $v_p$ is the platform velocity, and $l$ is the receiving transducer length. The minimum PRI sets the maximum unambiguous swath width across track: the maximum slant range ($r_{max}$) that a SAS can map is written as $$r_{max} = \frac{ct_{PRI}}{2} = \frac{cl}{4v_p}$$

Further the maximum Area Coverage Rate (ACR) can then be written independently of vehicle speed as $$ACR = v_p x_{max} = \frac{cl}{4\sin(\theta)}$$

As such, for speed of sound of c=1500 m/s, a 0.25 m long transducer and single-sided mapping, the ACR is limited to 0.38 km²/hr. unless more sophisticated methods (or multiple/longer arrays) are utilized.

It should be noted that the ACR above is completely independent of vehicle speed, and completely dependent on aperture length. As such, unless advanced processing is utilized, there will always exist a linear penalty for shrinking the length of the aperture.

There is therefore a defined need in the industry for an improved SAS system having a high resolution yet a smaller length of aperture.

SUMMARY OF THE INVENTION

In this disclosure, a new SAS approach is presented that allows for shorter antennas while preserving coverage rate and high resolution.

A novel method of operating a synthetic aperture sonar apparatus, which is referred to herein as "ScanSAS", utilizes a unique timing and pointing method to illuminate and process data from multiple receive channels over one or more elevation swaths. More specifically, the method comprises the steps of illuminating a first elevation swath using a first pulse rate interval (PRI) and a second elevation swath using a second pulse rate interval (PRI), and receiving timeshared image data from a transducer array across the first and second elevation swaths, and generating 2D topographic image data therefrom. As noted above, additional swaths may also be employed for further improvement of ACR and resolution.

The only drawback to this new approach, is in the significantly larger number of digitized channels required for processing. However, this drawback is enabled by new digital transceiver hardware which reduces the size of multichannel digital receivers. The present approach thus achieves competitive coverage rates and state-of-the-art resolutions with a transducer array of no longer than 25 cm, a size that can be accommodated on even the smaller available μUUVs.

Embodiments of the design presented herein also include interferometric capability. This augmentation to ScanSAS allows direct measurement of the surface topography through the use of triangulation from two transducer receive arrays displaced vertically on the vehicle. With such an approach, topographic accuracies of less than 2 cm are possible.

Key performance parameters that the present system and method achieve include:
  Transducer size: 25 cm length, 6 cm width (imaging) or 12 cm width (topography)
  Single sided area coverage rate: 0.4-0.5 km2/s Theoretical resolution/accuracy: 3 cm×3 cm images, 2 cm height (10 cm×10 cm res.)

System power use: less than 100 W, including onboard InSAS processing

System electronics size: fits in 6 in diameter (15 cm) vehicle, less than 25 cm length.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

Figure 1:
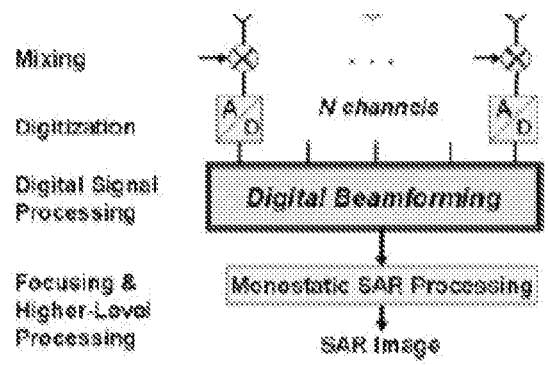
FIG. 1 is an illustration of a multi-channel digital beam-forming process in an exemplary radar configuration.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Turing now to the drawing figures, there is described a novel timing and illumination methodology that forms the basis for the invention.

The theoretical along track (hereafter referred to as azimuth) resolution of a SAS system, $\delta_y$, is $$\delta_y = \frac{l}{2}$$

While in theory one pays a coverage penalty for a shorter physical aperture, the maximum azimuth resolution improves linearly as well. To overcome this limitation, it is proposed to subdivide the receive array into N sections in the along track and using digital receivers achieve a N improvement in resolution, allowing fine resolution from a relatively large aperture.

From a 0.25 m aperture, the use of, for example, 8 subchannels (N=8), allows a theoretical maximum azimuth resolution of 1.6 cm. At the same time, the longer array reduces the Doppler spread allowing for larger swath coverage.

SAS Design

In this section, the practical capabilities of a single-sided 0.25 m aperture SAS is discussed.

As an example, we start with platform with velocity of 2.5 m/s (4.9 kts), which from a critical sampling perspective requires a pulse repetition frequency (PRF) of 20 Hz. For illustrative purposes, we first look at a 10 m mapping vehicle altitude (h) above the sea floor, although we examine the implications of altitude changes later in this section. From a signal-to-noise ratio (SNR) perspective, we also assume a 10 ms pulse, although the necessary pulse length may be relaxed given the significant array gain.

With a 50 ms pulse repetition interval and a desire to map larger look angles to maximize swath, our design requires 2 pulses in the water at any given time (i.e. the first range ambiguity is used for the swath window). The available swath then constitutes a range of 60-100 ms, or a slant range of 45-75 m. The equivalent ground range, for h=10 m, is 43.9-74.3 m, or an ACR=0.27 km²/hr. The other parameters are listed in Table 1 and calculated for several different altitudes.

TABLE 1 single-swath SAS design for a 0.25 m aperture and vehicle speed $v_s$ = 2.5 m/s.

| Parameter | h = 5 m | h = 10 m | h = 15 m | h = 20 m | h = 25 m |
|---|---|---|---|---|---|
| Slant range [m] | 45.0-75.0 | 45.0-75.0 | 45.0-75.0 | 45.0-75.0 | 45.0-75.0 |
| Ground range [m] | 44.7-74.8 | 43.9-74.3 | 42.4-73.5 | 40.3-72.3 | 37.4-70.7 |
| Ground Swath [m] | 30.1 | 30.5 | 31.1 | 32.0 | 33.3 |
| Angle range [deg] | 83.6-86.2 | 77.2-82.3 | 70.5-78.5 | 63.6-74.5 | 56.3-70.5 |
| Look Angle [deg] | 84.9 | 79.7 | 74.5 | 69.1 | 63.4 |
| Elevation Beamwidth [deg] | 2.6 | 5.2 | 7.9 | 10.9 | 14.3 |
| ACR | 0.27 | 0.27 | 0.28 | 0.29 | 0.30 |

The required elevation beamwidth to cover the expected swath is 5.2 deg at h=10 m. However, because there is a guard band of the transmit pulse on either side, this requirement is not particularly tight; further, because there is an approximately linear need to grow the antenna beamwidth with increasing altitude (or to perform some level of adaptive beamforming), one must set a maximum antenna size and degrees of freedom based on the expected altitude range, as well as the vehicle orientation requirements. This is explored below, following the discussion of elevation scanning.

Elevation Scanning to Increase Swath: ScanSAS

The shorter antenna imposes a higher PRF and as such decreases the available timing for receive, reducing the coverage rate. To improve on the ACR values shown in Table 1 we utilize a unique and novel timing and pointing configuration to illuminate and process one or more additional swaths. Although two elevation swaths are described herein, it should be understood that the technique is applicable to multiple elevation swaths and the limitation is dependent on processing power only.

Figure 2:
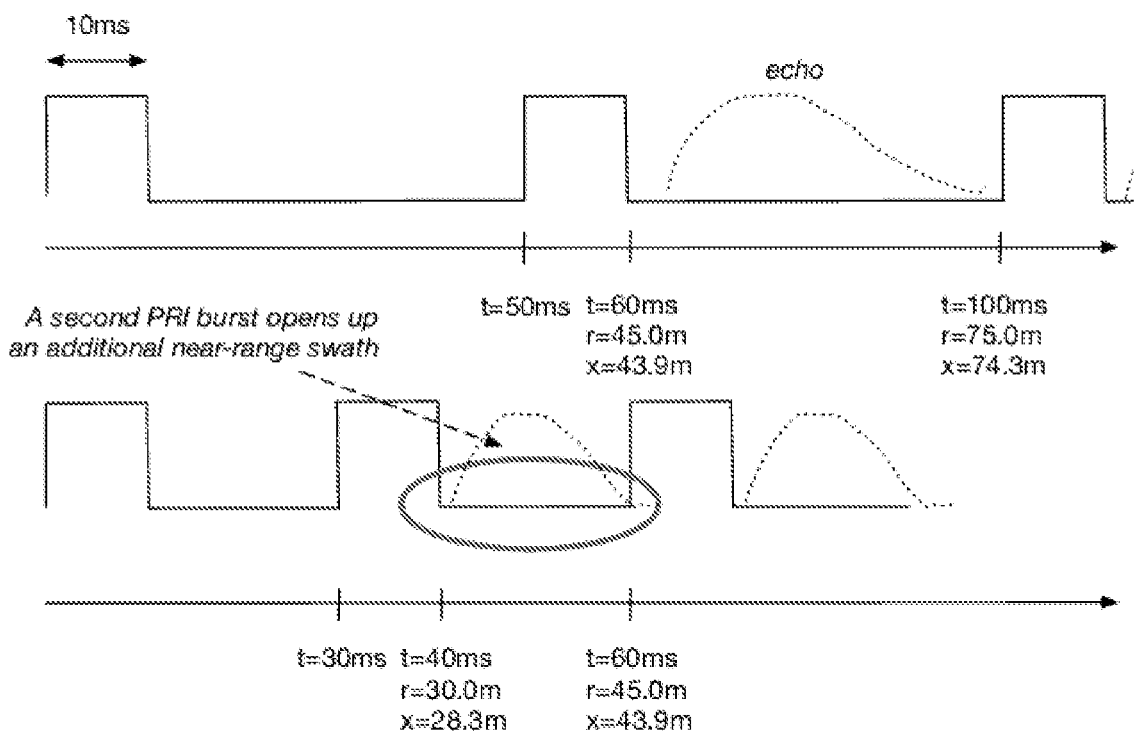
FIG. 2 illustrates a novel timing concept for increasing SAS area coverage through the use of 2 pulse rate intervals over two elevation swaths in accordance with the present disclosure.

FIG. 2 illustrates the present timing scenario for the nominal height of 10 m. The upper pulse sequence represents the nominal burst or PRI listed in Table 1. With a minimum PRI of 50 ms, we can achieve 30 m of slant range resolution. The lower PRI must be higher than the minimum, and so—given the incidence angle ranges at work—we choose to maintain the number of range ambiguities, allowing us to also acquire data in a closer swath, extending the slant range swath by 15 m, and the ground range swath, at h=10 m, by 15.6 m, a 50% increase in the swath and coverage rate. Across all the altitudes, the ACR thus improves to 0.41-0.49 km²/hr.

Nominally the penalty one pays for increasing coverage is in azimuth resolution. Achieving full azimuth resolution with SAS requires that a target be imaged with continuous pulses (at PRF=$2v_p/l$) as long as the target is in the field of view, i.e. for a vehicle velocity $v_p$, target range $r_0$, and antenna beamwidth $\theta_{bw}$, the target must be imaged for time $t=\theta_{bw}r_0/v_p$. However, by timesharing among the two elevation swaths, we limit the number of pulses on a given target.

The reference design above provides an example. With a vehicle velocity of 2.5 m/s and a center frequency of 450 Hz, each element (not the full array) in an 8 element array sees a Doppler bandwidth of +/−80 Hz. The full aperture length for the far swath ($r_0$=75 m) can be estimated from $$t_a = \theta_{bw} r / v_p$$

or 3.2 s of synthesis time (8 m). If only 1.6 s of dwell time are available due to the addition of a second swath, the eventual aperture length is 4 m, yielding a final resolution of $$\delta_{az} = \frac{\lambda}{2D}$$

or 0.4 mrad. (Recall that the denominator factor of 2 comes from the SAS formation algorithm). This can be confirmed in the Doppler domain by considering that in 1.6 s we send 32 pulses, which when multiplied by the 8 receivers, yields a Doppler resolution of $B_D$=160 Hz/256=0.625 Hz. In the azimuth direction, this is found from $$\delta_{az} = \frac{B_D \lambda}{2v_p}$$

or 0.4 mrad, again. Notably, at 75 m range, 0.4 mrad yields an azimuth resolution of 3 cm, which is still reasonable and in family with state-of-the-art systems.

Transducer Implications

In azimuth the implications of our design for the transducer array are relatively straightforward: we require 8 independent, equally spaced channels over a distance of 0.25 m. This design parameter is independent of center frequency. For reference we note that at 450 Hz center frequency, 0.25 m is 75 wavelengths, implying that each of the 8 channels is made of a minimum of 19 subchannels, assuming half-wavelength element spacing.

In elevation the situation is more complex. Table 2 lists the range of look-angles and elevation beamwidth to maintain the correct illumination on the swath:

TABLE 2

Look angles and elevation beamwidth for near- and far-swaths as a function of altitude.

| Parameter | h = 5 m | h = 10 m | h = 15 m | h = 20 m | h = 25 m |
|---|---|---|---|---|---|
| Look Angle [deg] - Swath 1 | 84.9 | 79.7 | 74.5 | 69.1 | 63.4 |
| Elevation BW [deg] - Swath 1 | 2.6 | 5.2 | 7.9 | 10.9 | 14.3 |
| Look Angle [deg] - Swath 2 | 82.0 | 73.8 | 65.3 | 55.9 | 44.9 |
| Elevation BW [deg] - Swath 2 | 3.2 | 6.6 | 10.5 | 15.4 | 22.7 |

While in theory, one would utilize different elevation beamwidths for the two swaths, in practice it is acceptable to have the same beamwidth, as some amount of guard timing is available due to the transmit event (see FIG. 2).

If we assume

Finest elevation beamwidth of ~3 degrees

Coarsest beamwidth of ~15 degrees

For our same 450 kHz center frequency we arrive at an antenna 6.3 cm at its maximum extent in elevation dimension, or approximately 19 wavelengths (i.e. 38 elements). This dimension does scale with center frequency, so the higher center frequency that is chosen keeps the aperture to a reasonable size. Further, while there is no direct need to sample directly all channels, the ability to control and limit the array would arrive at the steerability required, which is up to ~40 deg if the vehicle roll is not considered, or ~20 deg if vehicle orientation can be used to make a coarse roll correction.

Transducer Design

Transducers made with piezocomposite are naturally broadband (up to 80%), have high sensitivity (up to 10 dB more than solid ceramic transducers), and can be made in cost effective large sheets. The material is conformable and can be shaped to tailor the directivity (beam patterns) or to mimic the shape of a vehicle to reduce hydrodynamic drag. Because a significant amount (60% to 85%) of the material is polymer, piezocomposite transducers are much lighter weight and couple better to the water. There is a large design space that allows a wider transducer optimization by adjusting the matrix material, active material (PZT in most cases), and the ratio of active to inactive material (volume fraction). Shading a piezocomposite transducer to reduce side lobes is straightforward and very cost effective. This is accomplished by screen printing a shaped electrode directly on the piezocomposite.

The transducer design for this system leverages the advantages of piezocomposite construction. Multi-element arrays can be constructed out of sheets of composite. The element configuration, count, and size can all be adjusted based on the desired parameters. Arrays can also be tiled together for longer vehicles, should that be desired. Should the frequency need to be modified, this is done by simply grinding the composite to a different thickness, or using a different ceramic preform.

Piezocomposite transducers have been used in a wide range of applications, including mine detection, mine classification, swimmer detection, harbor security, torpedo homing, parametric sonar for sub-bottom profiling, AUV sonar including side-scans, forward looking sonar, obstacle avoidance, bottom mapping, and acoustic communications (ACOMMS). They perform well in shallow water, at full ocean depth, low duty and high cycles (including 100%) and are amenable to creating low-cost, high element count arrays.

Interferometric Height Mapping

Figure 3:
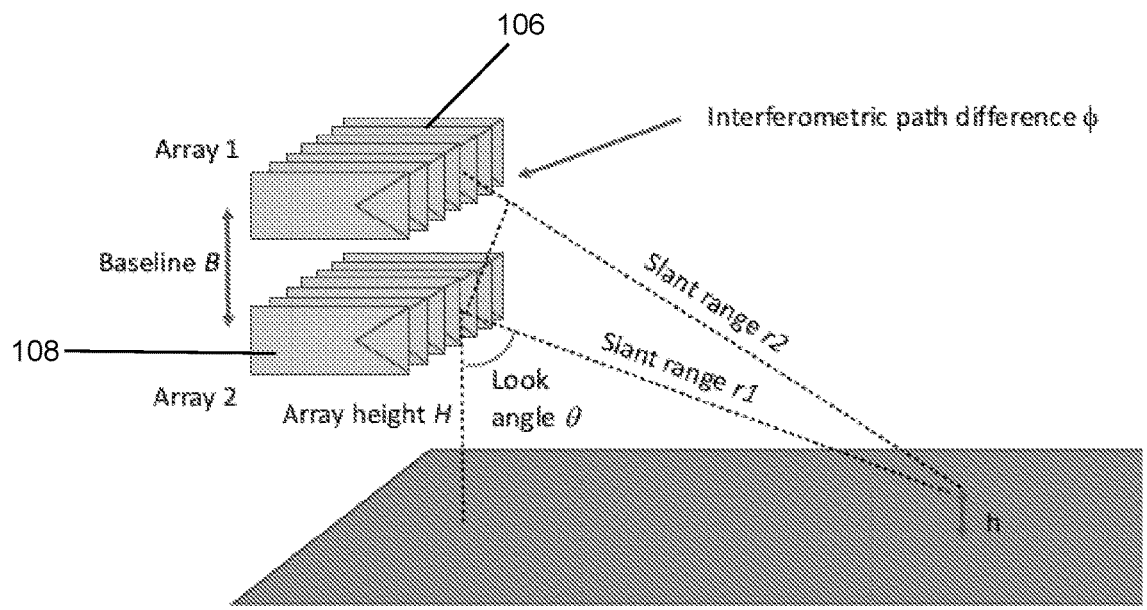
FIG. 3 is an illustration of across-track interferometry using a phase difference between two vertically spaced receiver arrays.

While side-looking SAS can provide two-dimensional imagery, an ambiguity still exists between distance and topography. That ambiguity can only be solved through the integration of another dimension of imaging. While stereo imaging is possible, better accuracy is obtained through the use of the received phase from two across-track (or vertically) separated antennas, i.e. "cross-track interferometry", or XTI. The XTI concept is illustrated in FIG. 3.

The improvements by the use of height, versus contrast, for object discrimination is considerable.

Figure 4:
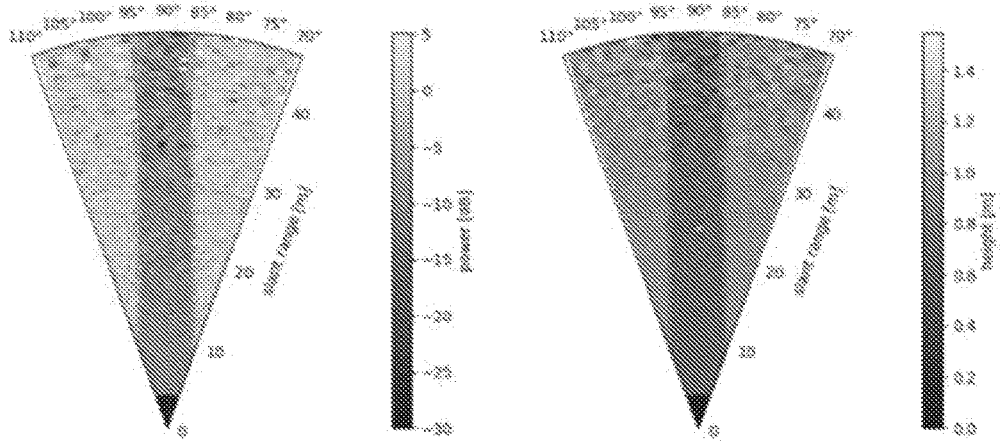
FIG. 4 illustrates a simulated forward-looking interferometer power (left) and height (right) data, showing a long flat surface in front of a moving platform.

FIG. 4 illustrates a simulated forward-looking interferometer power (left) and height (right) data, including a long flat surface in front of a moving system. A 50 cm obstacle is present at 25 m distance. The obstacle here has lower contrast than the background but is still highly visible in the height image (i.e. the elevated cell—yellow color).

With a high SNR, favorable geometry, and reasonable separation (~6 cm, or the elevation transducer size), we can achieve sub-centimetric-class precision in our height mapping providing true 3D mapping. With the present system parameters, the phase wrap height would be 0.5 m which allows for a significant amount of relief across-track (range pixel to range pixel).

Multichannel Digital Transceiver and Processor

Figure 5:
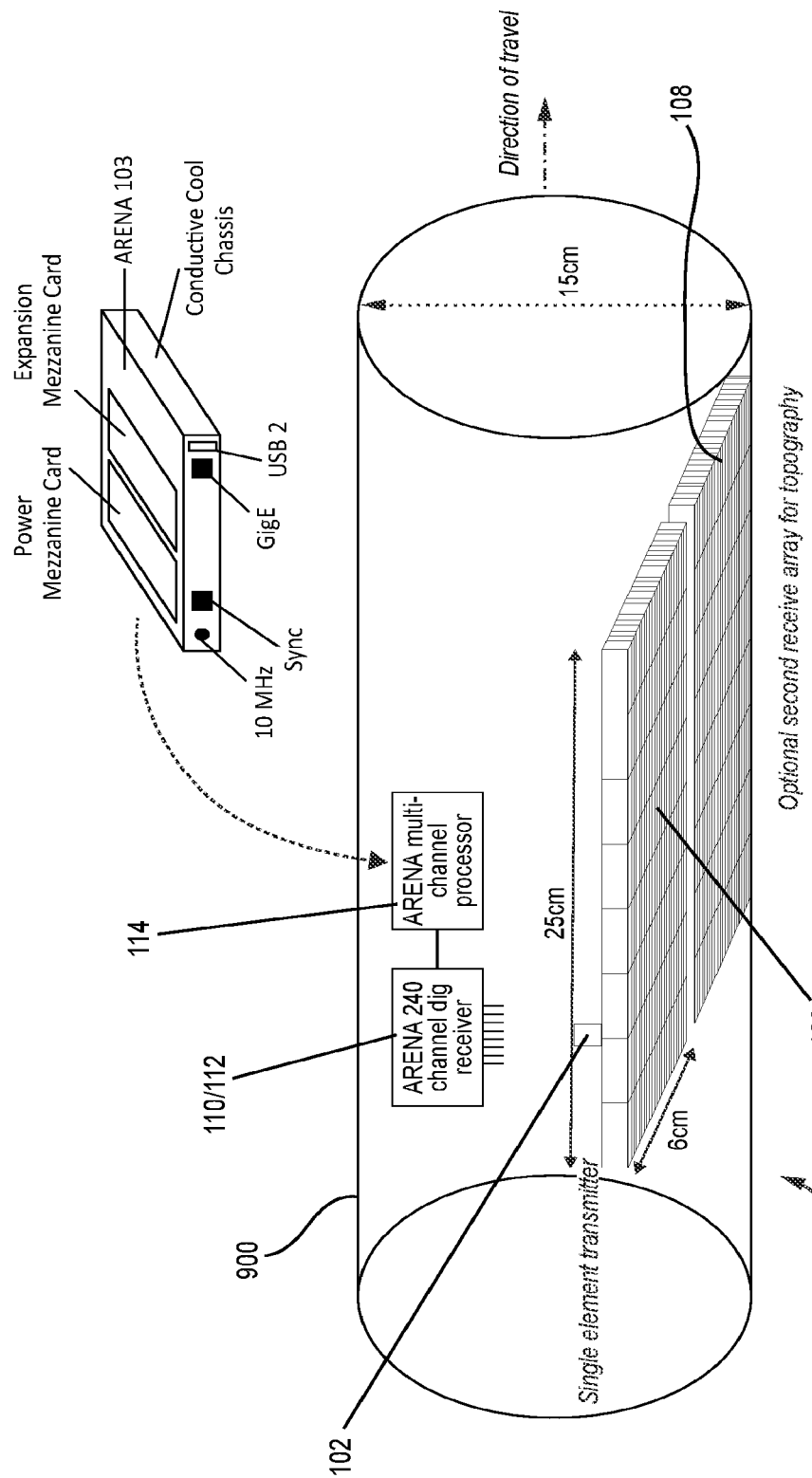
FIG. 5 is a schematic illustration of a complete ScanSAS system disposed within a 15 cm diameter μUUV.
Figure 6:
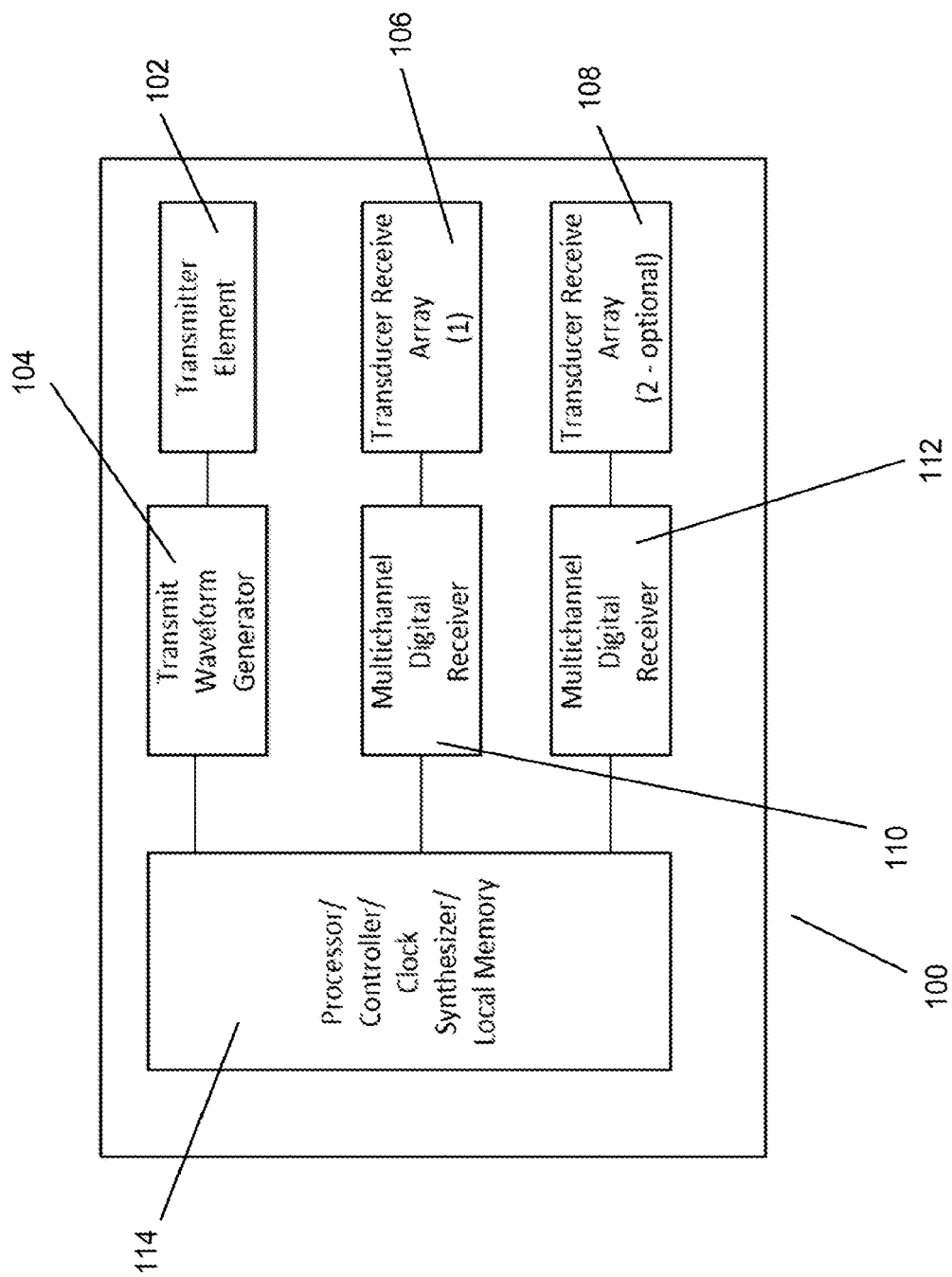
FIG. 6 is a schematic block diagram of the various exemplary system components.

Referring to FIGS. 5 and 6 there is illustrated an exemplary ScanSAS system 100 in accordance with the teachings described herein. The system 100 may be deployed in a μUUV housing 900 which measures approximately 15 cm or 6 inches in diameter and may be of indeterminate length, although it must accommodate at least the 25 cm length of the transducer receive array.

The core multi-channel digital receiver and processing technologies that enable the present system are based on the Remote Sensing Solutions ARENA® technology (ARENA is a registered trademark of Remote Sensing Solutions, Inc.). Representative ARENA systems, subsystems and the underlying digital architecture are fully explained and disclosed in US Patent Publication No. US20180321358A1, the entire contents of which are incorporated herein by reference.

The ARENA digital architecture allows the reception and scanSAS processing of the full ~240 channels of the exemplary design. With a full processing throughput of less than 20 MHz, the design created herein is an order of magnitude less than the full ARENA capabilities, and fits comfortably in a smaller ARENA 103 series chassis, which may be re-packaged for the vehicle form factor (discussed below).

The exemplary system 100 as illustrated comprises the following elements:

A small transmit element 102 and associated drive electronics 104;
A 25 cm×6 cm transducer receive array 106;
An optional 25 cm×6 cm second transducer receive array 108 for topographic mapping;
A miniature 240 channel digitizer 110, 112 mounted to the back of each array (one per receiver) 106, 108;
A single, miniature receiver and processor card 114, on which all motion compensation and InSAS processing is performed, as well as the system timing.

The overall system 100 can be extremely compact. A small picture of a comparable RSS ARENA 103 unit is shown in FIG. 5, which fits easily into the vehicle diameter as illustrated.

A system as illustrated in FIG. 5 can fit within a 100 W target power value (50 W for system operation, and 50 W for InSAS processing), some 30-50% lower in power than other competitive systems, and, with optimization, possibly achieve far lower values.

Collected System Parameters

All of the reference design system parameters are collected into the following table for reference.

| Parameter | Unit | Value |
| --- | --- | --- |
| Platform Altitude Range | m | 5-25 |
| Platform Velocity Range | m/s | 1-2.5 |
| System Center Frequency | kHz | 450 |
| System Bandwidth | kHz | 80 |
| Receive Transducer Array Length | m | 0.25 |
| Number of sub-arrays - azimuth | — | 8 |
| Receive Transducer Array Width | m | 0.063 |
| Elevation Steerable Range | deg | 20 or 40 |
| Theoretical Resolution | cm × cm | 3 × 3 |
| Baseline Separation | m | 0.063 |
| Transmit Transducer Length | m | 0.03 |
| Transmit Transducer Width | m | 0.01 |
| Total ACR (single swath) | km$^2$/hr | 0.41-0.49 |

Then on a per-swath basis, for a 10 m altitude:

| Parameter | Unit | Swath 1 | Swath 2 |
| --- | --- | --- | --- |
| Nominal Look Angle | deg | 73.8 | 79.7 |
| Swath Near Ground Range | m | 43.9 | 28.3 |
| Swath Far Ground Range | m | 74.3 | 43.9 |
| ACR | Km^2/hr | 0.27 | 0.13 |
| Topography Precision | cm | 1.6 | 0.5 |
| Topography Horz. Posting | cm × cm | 10 × 10 | 10 × 10 |

The reference design chosen utilizes a center frequency of 450 kHz, and arrives at a basic mapping receive transducer of 25 cm in azimuth and 6.3 cm in elevation. Adding interferometric mapping doubles the width of the array to 25 cm×12.6 cm.

The length of the aperture is independent of center frequency, and is instead directly related to the Area Coverage Rate (ACR). Any change in the frequency would not impact the length; however, if additional length on the vehicle is available, a longer aperture may provide increased ACR or a simplification of the ScanSAS timing scheme. This also enables this design to be deployed on larger UUVs as well.

The width of the aperture is directly related to the chosen center frequency. As such, a lower center frequency may provide less loss as a function of distance, but also suffers from lower antenna gain for a given aperture length, even if the aperture can grow in width. As such, reducing the center frequency may not provide significant if any gains, depending on the final area available for the transducer array.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A synthetic aperture sonar apparatus comprising:
a multi-channel digital receiver comprising a first array of transducers and a second array of transducers spaced vertically from the first array of transducers by a baseline distance B; and
a processor operatively coupled to the multi-channel digital receiver, the processor configured to receive timeshared data from said first array of transducers responsive to reflections from a first elevation swath illuminated with a first pulse rate interval and reflections from a second elevation swath illuminated using a second pulse rate interval, the processor further configured to receive additional timeshared data from said second array of transducers responsive to reflections from the first elevation swath illuminated with the first pulse rate interval and reflections from the second elevation swath illuminated using the second pulse rate interval, and to apply interferometric processing to generate 3D topographic image data from the received timeshared data from the first array of transducers and the second array of transducers.

2. The synthetic aperture sonar apparatus of claim 1 wherein the first elevation swath and the second elevation swath have different elevation beam widths.

3. The synthetic aperture sonar apparatus of claim 1 wherein the first elevation swath and the second elevation swath have the same elevation beam width.

4. The synthetic aperture sonar apparatus of claim 1 wherein said first array of transducers is not longer than 25 cm.

5. The synthetic aperture sonar apparatus of claim 1 wherein said first array of transducers is not wider than 6 cm.

6. The synthetic aperture sonar array of claim 1 wherein said first array of transducers comprises a conformable material.

7. A method of operating a synthetic aperture sonar apparatus comprising the steps of:
receiving timeshared data from a first transducer array responsive to illumination of a first elevation swath using a first pulse interval rate and a second elevation swath using a second pulse interval rate;
further receiving timeshared data from a second transducer array across said first and second elevation swaths responsive to illumination of the first elevation swath using the first pulse interval rate and the second elevation swath using the second pulse interval rate; and
applying interferometric processing to generate 3D topographic image data from the timeshared data received from the first array of transducers and the second array of transducers.

8. The method of claim 7 wherein the first elevation swath and the second elevation swath have different elevation beam widths.

9. The method of claim 7 wherein the first elevation swath and the second elevation swath have the same elevation beam width.

* * * * *